US012435985B2

(12) United States Patent
Zhao et al.

(10) Patent No.: US 12,435,985 B2
(45) Date of Patent: Oct. 7, 2025

(54) MULTI-MODAL COGNITIVE MECHANISM FOR ROAD SECTION RECOGNITION

(71) Applicant: International Business Machines Corporation, Armonk, NY (US)

(72) Inventors: Si Tong Zhao, Xian (CN); Jing Wen Xu, Shanghai (CN); Zhong Fang Yuan, Xi'an (CN); Ya Dong Li, Beijing (CN); Hai Bo Zou, Beijing (CN); Xuan Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 17/456,895

(22) Filed: Nov. 30, 2021

(65) Prior Publication Data

US 2023/0168093 A1 Jun. 1, 2023

(51) Int. Cl.
*G01C 21/34* (2006.01)
*G06F 18/214* (2023.01)
(Continued)

(52) U.S. Cl.
CPC ..... *G01C 21/3461* (2013.01); *G01C 21/3492* (2013.01); *G06F 18/2148* (2023.01); *G06N 20/00* (2019.01); *G06V 20/56* (2022.01)

(58) Field of Classification Search
CPC ............ G01C 21/3461; G01C 21/3492; G06N 20/00; G06V 20/56
(Continued)

(56) References Cited

U.S. PATENT DOCUMENTS 8,204,288 B2 6/2012 Kim
10,365,248 B2 7/2019 Paturle
(Continued)

FOREIGN PATENT DOCUMENTS

CN 106157972 A 11/2016
EP 2947447 A1 11/2015
(Continued)

OTHER PUBLICATIONS

"Notification of Transmittal of the International Search Report and the Written Opinion of the International Searching Authority, or the Declaration", From the International Searching Authority, International application No. PCT/IB2022/061436, Date of mailing: Feb. 17, 2023, International filing date: Nov. 25, 2022, 9 pgs.
(Continued)

*Primary Examiner* — Thjuan K Addy
(74) *Attorney, Agent, or Firm* — Aaron N. Pontikos

(57) ABSTRACT

In an approach for road section recognition using multi-modal cognitive mechanism, a processor receives an audio signal from a road test. A processor processes the audio signal to generate an acoustic spectrum density distribution map to identify a respective at least one road section switching point in a first mode. A processor processes a spectrogram of the audio signal to identify the respective at least one road section switching point in a second mode. A processor uses a machine learning model to predict an expected sound at each frame of the audio signal, to calculate a similarity between the expected sound and an actual sound, and to identify the respective at least one road switching point when the similarity is lower than a pre-set similarity threshold in a third mode. A processor combines results of the three modes to obtain a final set of road section switching points.

20 Claims, 3 Drawing Sheets

(51) Int. Cl.
  *G06N 20/00* (2019.01)
  *G06V 20/56* (2022.01)
(58) Field of Classification Search
  USPC ..................................... 381/86, 87, 386, 332
  See application file for complete search history.

(56) References Cited

U.S. PATENT DOCUMENTS

| | | | |
|---|---|---|---|
| 2011/0200191 A1 | 8/2011 | Fujimoto et al. | |
| 2011/0200199 A1 | 8/2011 | Yasumichi | |
| 2014/0327775 A1* | 11/2014 | Cho ....................... | H04N 23/62 348/148 |
| 2022/0083760 A1* | 3/2022 | Jones, Sr. ............ | G08G 1/0116 |

FOREIGN PATENT DOCUMENTS

| | | |
|---|---|---|
| EP | 3712020 A1 | 9/2020 |
| JP | 2019167760 A | 10/2019 |

OTHER PUBLICATIONS

Response to communication pursuant to Rule 161(1) and 162 EPC dated Dec. 20, 2024, Application No. 22829846.9, 5 pages.

Authors et al. Disclosed Anonymously, "Method and System for Road Quality Assessment", An IP.com Prior Art Database Technical Disclosure, IP.com No. IPCOM000256571D, IP.com Electronic Publication Date: Dec. 11, 2018, 4 Pages.

Authors et al. Disclosed Anonymously, "System and Method for Sound Wave Analysis and matching for surface condition detection using streaming analytics and high definition audio", An IP.com Prior Art Database Technical Disclosure, IP.com No. IPCOM000253019D, IP.com Electronic Publication Date: Feb. 27, 2018, 4 Pages.

Meinedo et al., "Audio segmentation, classification and clustering in a broadcast news task", 2003 IEEE International Conference on Acoustics, Speech, and Signal Processing, Proceedings, (ICASSP '03), Apr. 6-10, 2003, 4 Pages.

Zhang et al., "A Novel Classification-Based Audio Segmentation Algorithm", Tien Tzu Hsueh Pao/Acta Electronica Sinica, vol. 34, No. 4, Jan. 4, 2006, 3 Pages. (Abstract Only).

"Notification of Transmittal of the International Search Report and the Written Opinion of the International Searching Authority, or the Declaration", From the International Searching Authority, Applicant's or agent's file reference: P202101572PCT01, International application No. PCT/IB2022/061436, Date of mailing: Feb. 17, 2023, International filing date: Nov. 25, 2022, 9 pgs.

* cited by examiner

MULTI-MODAL COGNITIVE MECHANISM FOR ROAD SECTION RECOGNITION

BACKGROUND OF THE INVENTION

The present invention relates generally to the field of cognitive computing, and more particularly to a multi-modal cognitive mechanism for road section recognition.

Car makers test their cars in all types of environments. While much testing can be done on closed tracks, real-world car testing needs to take place in real-world conditions. By combining data from the closed tracks with information gleaned from driving on public roads, automakers use testing to create vehicles that they hope will satisfy the market. Car testing during production covers everything from performance and comfort to reliability and safety. The idea behind car testing is that it allows manufacturers to work out all the kinks and potential problems of a model before it goes into full production.

A usual method for a road tester is to drive on a special road and listen for any sounds made by the car to observe whether the car is malfunctioning. With the current digital transformation of businesses, some automakers have begun to use voice signal processing technology and machine learning methods to replace artificial hearing to identify faults. For fault identification during a road test of a vehicle, identification of the current road section and selection of different models is necessary. Thus, there is a need for automatic identification of the road section on which the road test is being performed. Generally, there are two ways to identify road sections. The first is to distinguish the loudness and frequency of sounds based on pre-applied rules. However, when there are many road shapes, it can be impossible to distinguish road sections accurately based on this, and abnormal sounds can cause interference. The second is to use a neural network architecture, but due to the irregular noise in the drive test process, the accuracy of this method is limited.

SUMMARY

Aspects of an embodiment of the present invention disclose a method, computer program product, and computer system for road section recognition using multi-modal cognitive mechanism. A processor receives an audio signal from a road test. A processor processes the audio signal to generate an acoustic spectrum density distribution map to identify a respective at least one road section switching point in a first mode. A processor processes a spectrogram of the audio signal to identify the respective at least one road section switching point in a second mode. A processor uses a machine learning model to predict an expected sound at each frame of the audio signal, to calculate a similarity between the expected sound and an actual sound, and to identify the respective at least one road switching point when the similarity is lower than a pre-set similarity threshold in a third mode. A processor combines results of the three modes to obtain a final set of road section switching points.

Aspects of an embodiment of the present invention improve the accuracy of road section recognition using a multi-modal cognitive mechanism that combines the results of three separate modes of road section recognition.

In some aspects of an embodiment of the present invention, processing the audio signal to generate the acoustic spectrum density distribution map to identify the respective at least one road section switching point comprises: preprocessing the audio signal with a background sound filter and a lowpass filter to produce a preprocessed audio sequence; generating a spectral density distribution map using sliding window processing on the preprocessed audio sequence; and identifying at least one corresponding extreme point at a transition on the spectral density distribution map.

In some aspects of an embodiment of the present invention, identifying the at least one corresponding extreme point at the transition on the spectral density distribution map comprises: finding the at least one corresponding extreme point based on a changing trend of the spectral density on a vertical axis of the spectral density distribution map; and filtering out outlier extreme points on the spectral density distribution map using a pre-set threshold.

In some aspects of an embodiment of the present invention, processing the spectrogram of sound waves of the audio signal to identify the respective at least one road section switching point comprises: generating a spectrogram image of the audio signal using frequencies in the audio signal; preprocessing the spectrogram image of the audio signal using contrast enhancement and converting from a color image to a grayscale image; filtering the preprocessed spectrogram image using binarization to convert the grayscale image into a binary image; completing image morphology processing one the preprocessed and filtered spectrogram image using kernels for corrosion and expansion operations to generate a fully processed spectrogram image; and identifying the respective at least one road section switching point by searching for largest connected domains on the fully processed spectrogram image.

In some aspects of an embodiment of the present invention, the machine learning model is trained on historical audio signal data from road tests; and the machine learning model is a long short-term memory (LSTM) model.

In some aspects of an embodiment of the present invention, the pre-set similarity threshold is based on performance of historical data in the machine learning model.

In some aspects of an embodiment of the present invention, the more similar the expected sound is to the actual sound, the smaller the similarity is between the expected sound and the actual sound.

DETAILED DESCRIPTION

Embodiments of the present invention recognize that for fault identification during a road test of a vehicle, identification of the current road section and selection of different models is necessary. Embodiments of the present invention recognize the need for a method that automatically identifies the road section on which the road test is being performed. Generally, there are two ways to identify road sections. The first is to distinguish the loudness and frequency of sounds based on pre-applied rules. However, when there are many road shapes, it can be impossible to distinguish road sections accurately based on this, and abnormal sounds can cause interference. The second is to use a neural network architecture, but due to the irregular noise in the drive test process, the accuracy of this method is limited.

Embodiments of the present invention provide a system and method for recognition of a road section using a multi-modal cognitive mechanism based on noise recognition. Embodiments of the present invention utilize three modes to identify a road section and combine results from the three modes to obtain a final set of road section switching points and effectively remove interference of a car fault sound. Embodiments of the present invention (1) analyze an acoustic wave spectral density, (2) find the connected domain of the acoustic wave spectrogram, and (3) construct a time series prediction model.

Embodiments of the present invention recognize advantages to this system and method: (1) eliminating the interference of a car breakdown sound by finding the largest connected domain of the spectrogram in one mode and using the predictive model in another mode and (2) improving the accuracy of road section recognition using multi-modal cognitive mechanism.

Implementation of embodiments of the invention may take a variety of forms, and exemplary implementation details are discussed subsequently with reference to the Figures.

Figure 1:
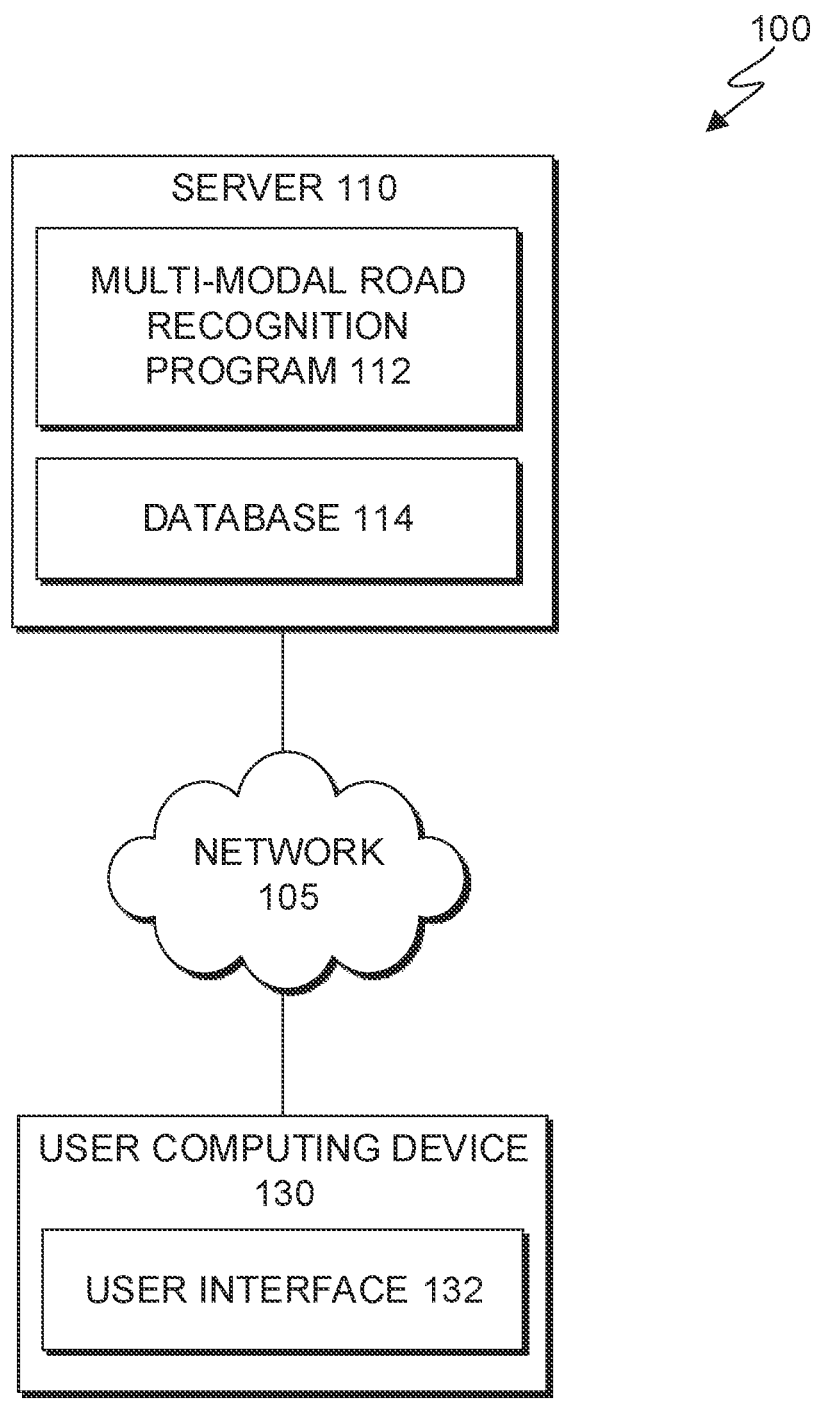
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 130, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 130, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 130 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes multi-modal road recognition program 112 and database 114. Server 110 may include internal and external hardware components, as depicted and described in further detail with respect to FIG. 3.

Multi-modal road recognition program 112 operates as a method for road section recognition using a multi-modal cognitive mechanism. In the depicted embodiment describe in FIG. 2, multi-modal road recognition program 112 uses three modes to identify road sections by finding switching points between road sections. In some embodiments, multi-modal road recognition program 112 completes the three modes concurrently. In other embodiments, multi-modal road recognition program 112 completes the three modes simultaneously. In the depicted embodiment, multi-modal road recognition program 112 is a standalone program. In another embodiment, multi-modal road recognition program 112 may be integrated into another software product, e.g., car testing software package. Multi-modal road recognition program 112 is depicted and described in further detail with respect to FIG. 2.

For a first mode, multi-modal road recognition program 112 uses an acoustic spectrum density distribution map to find road section switching points. In an embodiment, multi-modal road recognition program 112 preprocesses an incoming audio signal with background sound filter and lowpass filter and outputs a processed audio sequence. In an embodiment, multi-modal road recognition program 112 uses sliding window processing on the audio sequence to generate a spectral density distribution map. For example, multi-modal road recognition program 112 uses a window with a length of one (1) to slide the window on the time series data with a step length of 0.5 seconds (s) and calculates a spectral density for each is segment of audio signal to generate a graph (i.e., spectral density distribution map) of the change in spectral density with the horizontal axis being time and the vertical axis being the spectral density. In an embodiment, multi-modal road recognition program 112 finds at least one corresponding extreme point at a transition (i.e., road section switching point) on the spectral density distribution map. Multi-modal road recognition program 112 finds these extreme points based on a changing trend of the spectral density on the vertical axis of the map. In some embodiments, multi-modal road recognition program 112 uses a pre-set threshold to filter out extreme low points that are too low (i.e., an outlier).

For a second mode, multi-modal road recognition program 112 uses image processing technology to process a spectrogram of sound waves of a received audio signal to find road section switching points. In an embodiment, multi-modal road recognition program 112 generates a spectrogram of the audio signal using the frequencies in the audio signal. The spectrogram shows the characteristics of the frequency domain, i.e., a visual representation of the spectrum of frequencies (i.e., the signal strength or "loudness") of the received audio signal as the signal varies over time. In an embodiment, multi-modal road recognition program 112 preprocesses the spectrogram (also referred to as the "spectrogram image") of the audio signal using, e.g., contrast enhancement and/or converting from a color image to a grayscale image. In an embodiment, multi-modal road recognition program 112 filters the (preprocessed) spectrogram image using binarization, i.e., converting the grayscale image into a binary image. In several embodiments, multi-modal road recognition program 112 uses one or more filtering methods on the spectrogram image, e.g., Otsu's method, local mean method, local Gaussian method, etc. In an embodiment, multi-modal road recognition program 112 completes image morphology processing on the (preprocessed and filtered) spectrogram image using kernels, of any shape and size, for corrosion and expansion operations. In an embodiment, multi-modal road recognition program 112 finds locations of different road sections and location of road section switching points by searching for the largest connected domains on the processed spectrogram image. Multi-modal road recognition program 112 finds all the connected domains (white domains) and, from those, identifies the largest connected domains, which are considered to be the various road sections.

For a third mode, multi-modal road recognition program 112 uses a machine learning model to predict the sound at each frame of the received audio signal and calculate a similarity between the predicted value and the actual value, with the similarity being lower than a pre-set threshold at a road section switching point. In an embodiment, multi-modal road recognition program 112 uses a machine learning model that is trained on historical audio signal data from road tests. In an embodiment, multi-modal road recognition program 112 learns spectral centroids using long short-term memory (LSTM), which is an open-source machine learning model being used as a time series predictive model herein that is trained on historical data. In an embodiment, multi-modal road recognition program 112 predicts a next frame (i.e., sampling point or moment in the sound sequence) of the current input audio signal by LSTM based on a pre-frame of the audio signal. When the actual sound performance at the next moment is inconsistent with the prediction and the similarity is lower than a certain threshold, it is considered that an abnormal situation has occurred which the machine learning model can identify. In an embodiment, multi-modal road recognition program 112 receives a pre-set loss threshold that is based on performance of historical data in the machine learning model. In an embodiment, multi-modal road recognition program 112 computes loss between predicted frame and detected signal, in which the more similar the predicted next frame is to the actual audio performance, the smaller the loss. In an embodiment, multi-modal road recognition program 112 finds a switching point for a road section where the loss exceeded a threshold.

Database 114 operates as a repository for data received, used, and/or output by multi-modal road recognition program 112. Data received, used, and/or generated may include, but is not limited to, audio signals received from sound collection equipment, e.g., sensors, collecting data during a road test and any other data received, used, and/or output by multi-modal road recognition program 112. Database 114 can be implemented with any type of storage device capable of storing data and configuration files that can be accessed and utilized by server 110, such as a hard disk drive, a database server, or a flash memory. In an embodiment, database 114 is accessed by multi-modal road recognition program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that multi-modal road recognition program 112 has access to database 114.

User computing device 130 operates as a computing device associated with a user on which the user can interact with multi-modal road recognition program 112 through an application user interface. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105.

User interface 132 provides an interface between multi-modal road recognition program 112 on server 110 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enables a user of user computing device 130 to view and/or manage output of multi-modal road recognition program 112.

Figure 2:
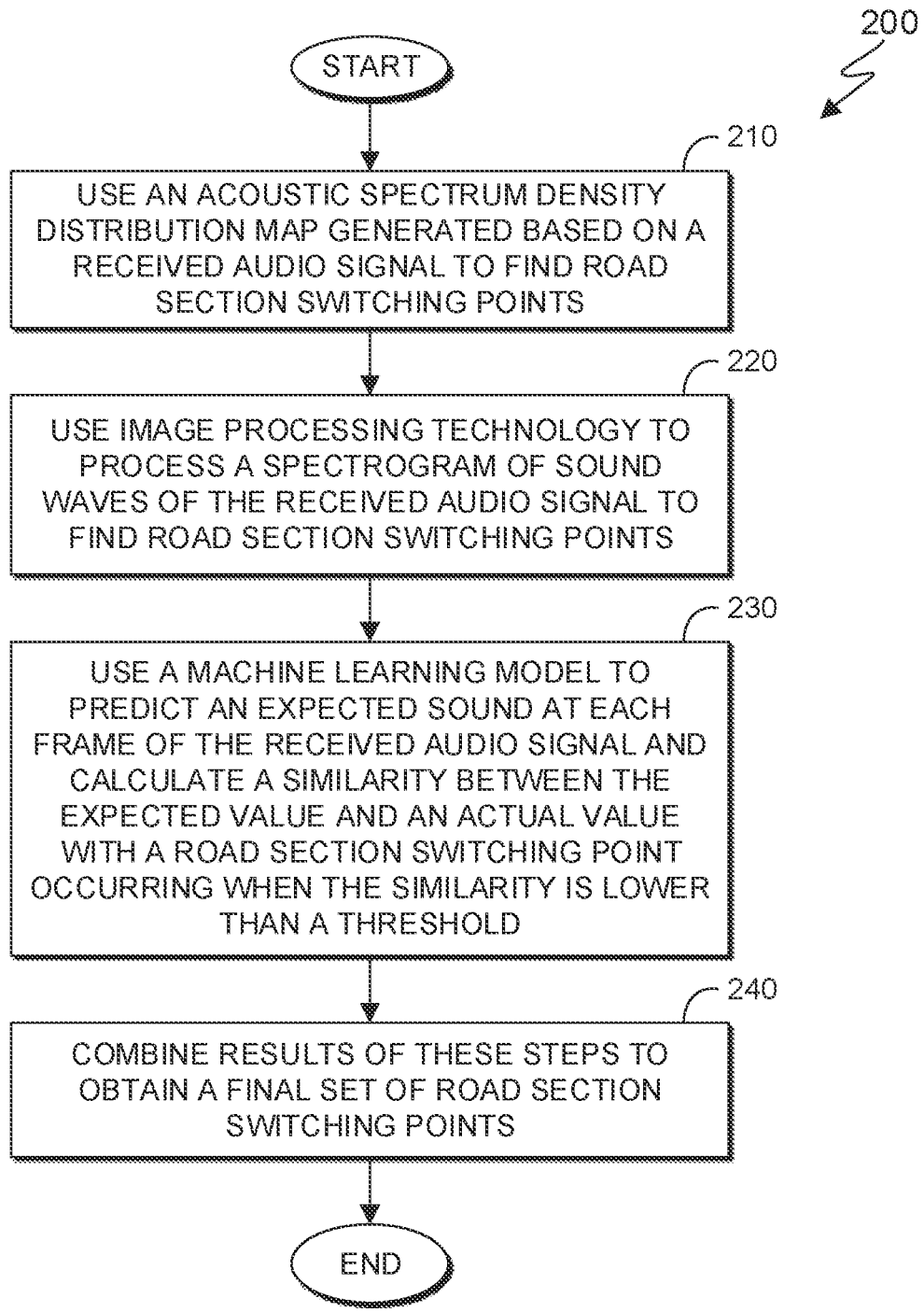
FIG. 2 is a flowchart depicting operational steps of a multi-modal road recognition program, for road section recognition using multi-modal cognitive mechanism, running on a server of the distributed data processing environment, in accordance with an embodiment of the present invention.
Figure 3:
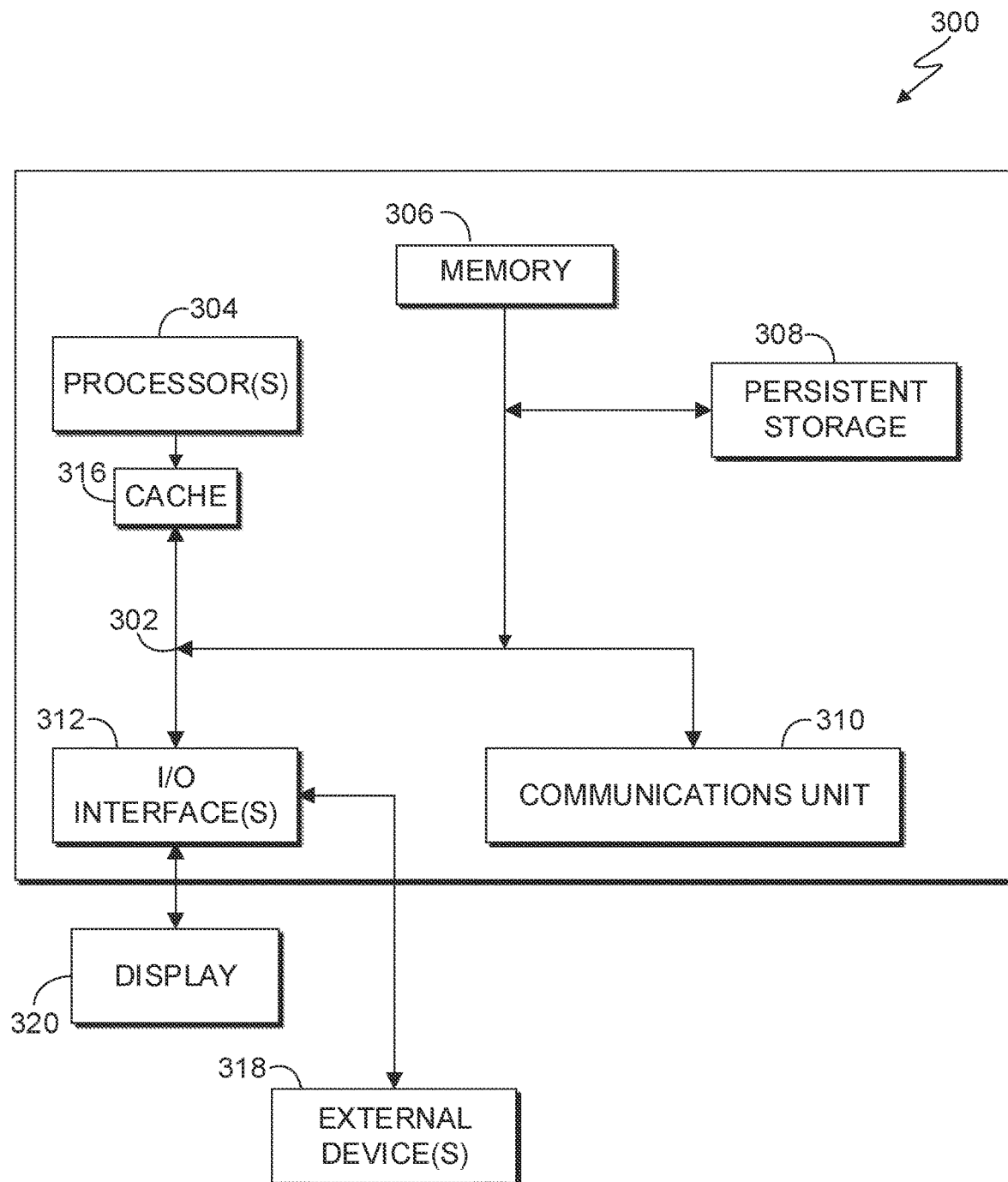
FIG. 3 depicts a block diagram of components of the server of the distributed data processing environment of FIG. 1, for running the multi-modal road recognition program, in accordance with an embodiment of the present invention.

FIG. 2 is a flowchart 200 depicting operational steps of multi-modal road recognition program 112, for road section recognition using a multi-modal cognitive mechanism. It should be appreciated that the process depicted in FIG. 3 illustrates one possible iteration of multi-modal road recognition program 112.

In step 210, multi-modal road recognition program 112 uses an acoustic spectrum density distribution map to find road section switching points. In an embodiment, multi-modal road recognition program 112 uses the received audio signal to generate an acoustic spectrum density distribution map to find road section switching points. In an embodiment, multi-modal road recognition program 112 preprocesses an incoming audio signal with background sound filter and lowpass filter and outputs a processed audio sequence. In an embodiment, multi-modal road recognition program 112 uses sliding window processing on the audio sequence to generate a spectral density distribution map. For example, multi-modal road recognition program 112 uses a window with a length of one (1) to slide the window on the time series data with a step length of 0.5 seconds (s) and calculates a spectral density for each is segment of audio signal to generate a graph (i.e., spectral density distribution map) of the change in spectral density with the horizontal axis being time and the vertical axis being the spectral density. In an embodiment, multi-modal road recognition program 112 finds at least one corresponding extreme point at a transition (i.e., road section switching point) on the spectral density distribution map. Multi-modal road recognition program 112 finds these extreme points based on a changing trend of the spectral density on the vertical axis of the map. In some embodiments, multi-modal road recognition program 112 uses a pre-set threshold to filter out extreme low points that are too low (i.e., an outlier).

In step 220, multi-modal road recognition program 112 uses image processing technology to process a spectrogram of sound waves of a received audio signal to find road section switching points. In an embodiment, multi-modal road recognition program 112 uses image processing technology to process a spectrogram of sound waves of a received audio signal to find road section switching points. In an embodiment, multi-modal road recognition program 112 generates a spectrogram of the audio signal using the frequencies in the audio signal. The spectrogram shows the characteristics of the frequency domain, i.e., a visual representation of the spectrum of frequencies (i.e., the signal strength or "loudness") of the received audio signal as the signal varies over time. In an embodiment, multi-modal road recognition program 112 preprocesses the spectrogram (also referred to as the "spectrogram image") of the audio signal using, e.g., contrast enhancement and/or converting from a color image to a grayscale image. In an embodiment, multi-modal road recognition program 112 filters the (preprocessed) spectrogram image using binarization, i.e., converting the grayscale image into a binary image. In several embodiments, multi-modal road recognition program 112 uses one or more filtering methods on the spectrogram image, e.g., Otsu's method, local mean method, local Gaussian method, etc. In an embodiment, multi-modal road recognition program 112 completes image morphology processing on the (preprocessed and filtered) spectrogram image using kernels, of any shape and size, for corrosion and expansion operations. In an embodiment, multi-modal road recognition program 112 finds locations of different road sections and location of road section switching points by searching for the largest connected domains on the processed spectrogram image. Multi-modal road recognition program 112 finds all the connected domains (white domains) and, from those, identifies the largest connected domains, which are considered to be the various road sections.

In step 230, multi-modal road recognition program 112 uses a machine learning model to predict the sound at each frame of the received audio signal and calculate a similarity between the predicted value and the actual value, with the similarity being lower than a pre-set threshold at a road section switching point. In an embodiment, multi-modal road recognition program 112 uses a machine learning model that is trained on historical audio signal data from road tests. In an embodiment, multi-modal road recognition program 112 learns spectral centroids using long short-term memory (LSTM), which is an open-source machine learning model being used as a time series predictive model herein that is trained on historical road test data. In an embodiment, multi-modal road recognition program 112 predicts a next frame (i.e., sampling point or moment in the sound sequence) of the received audio signal by LSTM based on a pre-frame of the audio signal. When the actual sound performance at the next moment is inconsistent with the prediction and the similarity is lower than a certain threshold, it is considered that an abnormal situation has occurred, which the machine learning model can identify and output. In an embodiment, multi-modal road recognition program 112 receives a pre-set loss threshold that is based on performance of historical data in the machine learning model. In an embodiment, multi-modal road recognition program 112 computes loss between predicted frame and detected signal, in which the more similar the predicted next frame is to the actual audio performance, the smaller the loss. In an embodiment, multi-modal road recognition program 112 finds a switching point for a road section where the loss exceeded a threshold.

In step 240, multi-modal road recognition program 112 combines results of the three modes to obtain a set of switching points. In an embodiment, after combining the results, multi-modal road recognition program 112 determines a final set of switching points using a preset time interval. In an embodiment, for a preset time interval, e.g., 3 seconds (s), if there is more than one (i.e., two out of the three) of the three modes (i.e., the modes of identifying road sections in steps 210, 220, and/or 230) that identifies a road section switching point has occurred in the time interval, then multi-modal road recognition program 112 determines that a road section switching point has occurred in the time interval. In an embodiment, multi-modal road recognition program 112 determines whether two or more of the modes identified a road section switching point in the preset time interval. If two or more of the modes identified a road section switching point in the preset time interval, then multi-modal road recognition program 112 determines a road section switching point did occur in the preset time interval. If one or none of the modes identified a road section switching point in the preset time interval, then multi-modal road recognition program 112 determines a road section switching point did not occur in the preset time interval.

In another embodiment, for a preset time interval, e.g., 3 seconds (s), if all three of the modes (i.e., the modes of identifying road sections in steps 210, 220, and/or 230) identify a road section switching point has occurred in the time interval, then multi-modal road recognition program 112 determines that a road section switching point has occurred in the time interval. For example, multi-modal road recognition program 112 combines results of the three modes [5 s, 50 s, 55 s, 59 s, 64 s, 69 s], [4 s, 50 s, 56 s, 58 s, 64 s, 70 s], and [4 s, 50 s, 55 s, 58 s, 64 s, 69 s], respectively, to obtain a set of switching points. Using a preset time interval of 3 s, multi-modal road recognition program 112 determines a final set of switching points using the preset time interval. For 0-3 s, multi-modal road recognition program 112 identifies no switching points. For 2-5 s, multi-modal road recognition program 112 identifies 5 s from the first mode, 4 s from the second mode, and 4 s from the third mode, so multi-modal road recognition program 112 identifies 4 s as a final switching point. For 48-51 s, multi-modal road recognition program 112 identifies 50 s from the first mode, 50 s from the second mode, and 50 s from the third mode, so multi-modal road recognition program 112 identifies 50 s as a final switching point. For 54-57 s, multi-modal road recognition program 112 identifies 55 s from the first mode, 56 s from the second mode, and 55 s from the third mode, so multi-modal road recognition program 112 identifies 55 s as a final switching point. For 56-59 s, multi-modal road recognition program 112 identifies 59 s from the first mode, 58 s from the second mode, and 58 s from the third mode, so multi-modal road recognition program 112 identifies 58 s as a final switching point. For 62-65 s, multi-modal road recognition program 112 identifies 64 s from the first mode, 64 s from the second mode, and 64 s from the third mode, so multi-modal road recognition program 112 identifies 64 s as a final switching point. For 68-71 s, multi-modal road recognition program 112 identifies 69 s from the first mode, 70 s from the second mode, and 69 s from the third mode, so multi-modal road recognition program 112 identifies 69 s as a final switching point. For this example, multi-modal road recognition program 112 identifies the final set of switching points as [4 s, 50 s, 55 s, 58 s, 64 s, 69 s]. This final output can also be expressed in the form of a time interval expressed as [[4 s-50 s], [55 s-58 s], [64 s-69 s]].

FIG. 3 depicts a block diagram of components of computing device 300, suitable for server 110 running multimodal road recognition program 112 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, an audio signal from a road test;
   processing, by the one or more processors, the audio signal to generate an acoustic spectrum density distribution map to identify a respective at least one road section switching point in a first mode;
   processing, by the one or more processors, a spectrogram of sound waves of the audio signal to identify the respective at least one road section switching point in a second mode;
   using, by the one or more processors, a machine learning model to predict an expected sound at each frame of the audio signal, to calculate a similarity between the expected sound and an actual sound, and to identify the respective at least one road switching point when the similarity is lower than a pre-set similarity threshold in a third mode; and
   combining, by the one or more processors, results of the first mode, the second mode, and the third mode to obtain a final set of road section switching points.

2. The computer-implemented method of claim 1, wherein processing the audio signal to generate the acoustic spectrum density distribution map to identify the respective at least one road section switching point comprises:
   preprocessing, by the one or more processors, the audio signal with a background sound filter and a lowpass filter to produce a preprocessed audio sequence;
   generating, by the one or more processors, a spectral density distribution map using sliding window processing on the preprocessed audio sequence; and
   identifying, by the one or more processors, at least one corresponding extreme point at a transition on the spectral density distribution map.

3. The computer-implemented method of claim 2, wherein identifying the at least one corresponding extreme point at the transition on the spectral density distribution map comprises:
   finding, by the one or more processors, the at least one corresponding extreme point based on a changing trend of the spectral density on a vertical axis of the spectral density distribution map; and
   filtering out, by the one or more processors, outlier extreme points on the spectral density distribution map using a pre-set threshold.

4. The computer-implemented method of claim 1, wherein processing the spectrogram of sound waves of the audio signal to identify the respective at least one road section switching point comprises:
- generating, by the one or more processors, a spectrogram image of the audio signal using frequencies in the audio signal;
- preprocessing, by the one or more processors, the spectrogram image of the audio signal using contrast enhancement and converting from a color image to a grayscale image;
- filtering, by the one or more processors, the preprocessed spectrogram image using binarization to convert the grayscale image into a binary image;
- completing, by the one or more processors, image morphology processing one the preprocessed and filtered spectrogram image using kernels for corrosion and expansion operations to generate a fully processed spectrogram image; and
- identifying, by the one or more processors, the respective at least one road section switching point by searching for largest connected domains on the fully processed spectrogram image.

5. The computer-implemented method of claim 1, wherein:
the machine learning model is trained on historical audio signal data from road tests; and
the machine learning model is a long short-term memory (LSTM) model.

6. The computer-implemented method of claim 1, wherein the pre-set similarity threshold is based on performance of historical data in the machine learning model.

7. The computer-implemented method of claim 1, wherein the more similar the expected sound is to the actual sound, the smaller the similarity is between the expected sound and the actual sound.

8. A computer program product comprising:
one or more computer readable storage media and program instructions collectively stored on the one or more computer readable storage media, the stored program instructions comprising:
program instructions to receive an audio signal from a road test;
program instructions to process the audio signal to generate an acoustic spectrum density distribution map to identify a respective at least one road section switching point in a first mode;
program instructions to process a spectrogram of sound waves of the audio signal to identify the respective at least one road section switching point in a second mode;
program instructions to use a machine learning model to predict an expected sound at each frame of the audio signal, to calculate a similarity between the expected sound and an actual sound, and to identify the respective at least one road switching point when the similarity is lower than a pre-set similarity threshold in a third mode; and
program instructions to combine results of the first mode, the second mode, and the third mode to obtain a final set of road section switching points.

9. The computer program product of claim 8, wherein the program instructions to process the audio signal to generate the acoustic spectrum density distribution map to identify the respective at least one road section switching point comprise:
- program instructions to preprocess the audio signal with a background sound filter and a lowpass filter to produce a preprocessed audio sequence;
- program instructions to generate a spectral density distribution map using sliding window processing on the preprocessed audio sequence; and
- program instructions to identify at least one corresponding extreme point at a transition on the spectral density distribution map.

10. The computer program product of claim 9, wherein the program instructions to identify the at least one corresponding extreme point at the transition on the spectral density distribution map comprise:
- program instructions to find the at least one corresponding extreme point based on a changing trend of the spectral density on a vertical axis of the spectral density distribution map; and
- program instructions to filter outlier extreme points on the spectral density distribution map using a pre-set threshold.

11. The computer program product of claim 8, wherein the program instructions to process the spectrogram of sound waves of the audio signal to identify the respective at least one road section switching point comprise:
- program instructions to generate a spectrogram image of the audio signal using frequencies in the audio signal;
- program instructions to preprocess the spectrogram image of the audio signal using contrast enhancement and converting from a color image to a grayscale image;
- program instructions to filter the preprocessed spectrogram image using binarization to convert the grayscale image into a binary image;
- program instructions to complete image morphology processing one the preprocessed and filtered spectrogram image using kernels for corrosion and expansion operations to generate a fully processed spectrogram image; and
- program instructions to identify the respective at least one road section switching point by searching for largest connected domains on the fully processed spectrogram image.

12. The computer program product of claim 8, wherein:
the machine learning model is trained on historical audio signal data from road tests; and
the machine learning model is a long short-term memory (LSTM) model.

13. The computer program product of claim 8, wherein the pre-set similarity threshold is based on performance of historical data in the machine learning model.

14. The computer program product of claim 8, wherein the more similar the expected sound is to the actual sound, the smaller the similarity is between the expected sound and the actual sound.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive an audio signal from a road test;
program instructions to process the audio signal to generate an acoustic spectrum density distribution map to identify a respective at least one road section switching point in a first mode;
program instructions to process a spectrogram of sound waves of the audio signal to identify the respective at least one road section switching point in a second mode;

program instructions to use a machine learning model to predict an expected sound at each frame of the audio signal, to calculate a similarity between the expected sound and an actual sound, and to identify the respective at least one road switching point when the similarity is lower than a pre-set similarity threshold in a third mode; and program instructions to combine results of the first mode, the second mode, and the third mode to obtain a final set of road section switching points.

16. The computer system of claim 15, wherein the program instructions to process the audio signal to generate the acoustic spectrum density distribution map to identify the respective at least one road section switching point comprise:

program instructions to preprocess the audio signal with a background sound filter and a lowpass filter to produce a preprocessed audio sequence;

program instructions to generate a spectral density distribution map using sliding window processing on the preprocessed audio sequence; and program instructions to identify at least one corresponding extreme point at a transition on the spectral density distribution map.

17. The computer system of claim 16, wherein the program instructions to identify the at least one corresponding extreme point at the transition on the spectral density distribution map comprise:

program instructions to find the at least one corresponding extreme point based on a changing trend of the spectral density on a vertical axis of the spectral density distribution map; and program instructions to filter outlier extreme points on the spectral density distribution map using a pre-set threshold.

18. The computer system of claim 15, wherein the program instructions to process the spectrogram of sound waves of the audio signal to identify the respective at least one road section switching point comprise:

program instructions to generate a spectrogram image of the audio signal using frequencies in the audio signal;

program instructions to preprocess the spectrogram image of the audio signal using contrast enhancement and converting from a color image to a grayscale image;

program instructions to filter the preprocessed spectrogram image using binarization to convert the grayscale image into a binary image;

program instructions to complete image morphology processing one the preprocessed and filtered spectrogram image using kernels for corrosion and expansion operations to generate a fully processed spectrogram image; and program instructions to identify the respective at least one road section switching point by searching for largest connected domains on the fully processed spectrogram image.

19. The computer system of claim 15, wherein:

the machine learning model is trained on historical audio signal data from road tests; and the machine learning model is a long short-term memory (LSTM) model.

20. The computer system of claim 15, wherein the pre-set similarity threshold is based on performance of historical data in the machine learning model.

* * * * *